Jan. 1, 1929.
W. SCHAFFER
1,697,208
THERMIONIC TUBE TRANSMITTER
Filed Feb. 24, 1925
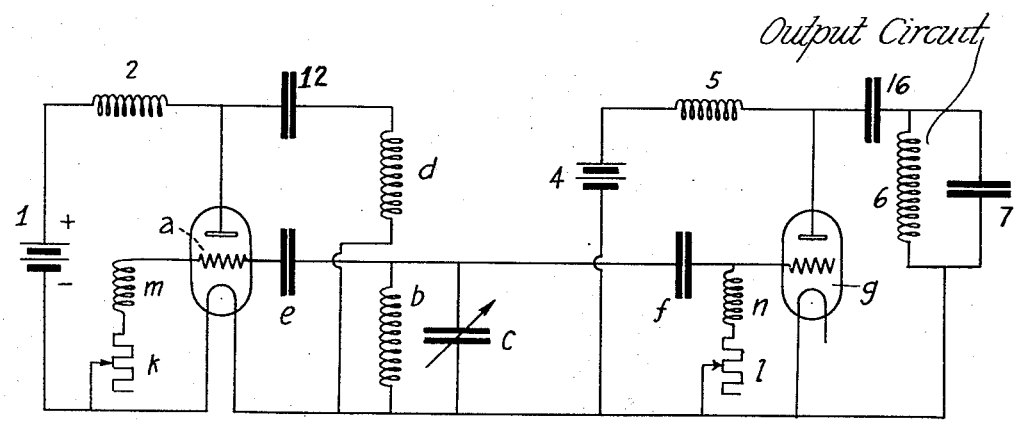
INVENTOR
WALTER SCHAFFER
BY
ATTORNEY Patented Jan. 1, 1929.

1,697,208

UNITED STATES PATENT OFFICE.

WALTER SCHAFFER, OF BERLIN, GERMANY, ASSIGNOR TO GESELLSCHAFT FÜR DRAHTLOSE TELEGRAPHIE M. B. H. HALLESCHES, OF BERLIN, GERMANY.

THERMIONIC TUBE TRANSMITTER.

Application filed February 24, 1925, Serial No. 11,020, and in Germany March 15, 1924.

My invention relates broadly to thermionic tube transmitters, and more specifically, to a transmitting arrangement where one self-excited controlling or oscillator tube feeds a separately excited or amplifying tube, and the amplifying tube in turn feeds a suitable load which may be either another amplifying tube or a transmission conductor. If applied to telephony transmission, modulation may be accomplished in any suitable manner known in the art, but the specific means for modulation forms no part of my invention.

An object of the invention is to provide an arrangement of the above described kind in which the necessary grid bias for all the tubes is provided by allowing the grids to accumulate a negative charge due to the rectifying action obtained by inserting grid condensers in the grid circuits between the grids and cathodes.

Another object of the invention is to provide this kind of arrangement with means so that all tendencies to generate parasitic oscillations will be discouraged to a very large extent.

Other objects will be apparent from the following description and claims when considered with the accompanying drawing in which the single figure is a circuit illustrating the principles of my invention.

In order to realize a maximum of simplicity in operation it is desirable in separately-excited transmitters that the grid potential which is used for the operation of the amplifier tubes proper, should be derived from the oscillation circuit of the controlling sender. Another point that is essential, so far as the working of the amplifier tubes is concerned, is that the circuit from which the grid potential is taken should contain little inductance and as much capacity as possible. This is for the purpose of keeping the grid voltage of any parasitic frequency as low as possible. The higher the capacity in the circuit connected with the grid of the amplifier tube so much less will be the chances for any other wave than the one adjusted, say, a stray wave, being allowed to arise. Also the D. C. voltage caused by the rectifying action at the grid should be taken directly from the terminals of the grid condenser.

Referring to the drawing, the self-excited three-element thermionic tube $a$ has its grid circuit and its plate circuit suitably coupled to produce sustained oscillations. Plate current is supplied by the B-battery 1 acting through choke coil 2. The period of the desired oscillations is determined by inductance $b$ and variable condenser $c$ connected in parallel with each other and in series with grid condenser $e$. Inductance coil $d$ is connected in the plate circuit and coupled to inductance $b$ to give the necessary feed-back. Blocking condenser 12 is inserted between the plate of tube $a$ and inductance coil $d$ to prevent plate current from flowing through the inductance coil $d$.

The three-element thermionic amplifying tube $g$ is supplied with plate current by B-battery 4 acting through choke coil 5. The grid circuit is supplied with energy from the common terminals of inductance $b$ and capacity $c$ acting through grid condenser $f$. The output circuit of amplifier tube $g$ consists of inductance 6 and condenser 7 connected in parallel and may be coupled to any desired load. The blocking condenser 16 is inserted in the plate circuit of tube $g$ for the purpose of keeping direct current out of the output circuit. The grid potentials of tubes $a$ and $g$ are independently controlled by variable grid leaks $k$ and $l$ in series with choke coils $m$ and $n$.

As pointed out above the inductance $b$ should be as small as possible and the capacities $c$, $e$ and $f$ should be as large as possible in order to keep voltages of possible parasitic oscillations on the grid as low as possible.

As regards operation, it is necessary that up to a certain point the grid potential acting upon the amplifier tube should be made variable independently of the controlling tube. This could conveniently be accomplished by regulating the grid discharge current of the controlling tube independently of the amplifier tube as by the use of regulable discharge resistances $k$ and $l$.

A special advantage of this connection resides in that the rotary condenser $c$ inserted in the oscillation circuit need be designed for relatively low voltages only.

Having described my invention I am entitled to all modifications thereof as fairly fall within the scope of the following claims:

1. An arrangement for the generation and amplification of oscillations comprising an oscillatory tube, a grid leak and a grid condenser for biasing the grid of the oscillator tube, an amplifier tube, a grid leak and a grid condenser for biasing the grid of the amplifier tube, and a resonant circuit which controls the frequency of the generated oscillations and acts as an output circuit for the oscillator tube and an input circuit for the amplifier tube directly connected between the grid condensers and the cathodes.

2. An arrangement for the generation and amplification of oscillations comprising an oscillator tube, a grid leak and a grid condenser for biasing the grid of the oscillator tube, an amplifier tube, a grid leak and a grid condenser for biasing the grid of the amplifier tube, a resonant circuit which controls the frequency of the generated oscillations and acts as an output circuit for the oscillator tube and an input circuit for the amplifier tube directly connected between the grid condensers and the cathodes, and an inductor in the anode circuit of the oscillator tube regeneratively coupled to an inductor in the resonant circuit.

3. An arrangement for the generation and amplification of oscillations comprising an oscillator tube, a grid leak and a grid condenser for biasing the grid of the oscillator tube, an amplifier tube, a grid leak and a grid condenser for biasing the grid of the amplifier tube, and a resonant circuit, which controls the frequency of the generated oscillations and acts as an output circuit for the oscillator tube and an input circuit for the amplifier tube directly connected between the grid condensers and the cathodes, said resonant circuit comprising as large a condenser and as small an inductor as is practicable in order to reduce the potential of parasitics applied to the grid of the amplifier tube.

WALTER SCHAFFER.